US008411953B2

(12) United States Patent
Deluca et al.

(10) Patent No.: US 8,411,953 B2
(45) Date of Patent: Apr. 2, 2013

(54) TAGGING IMAGES BY DETERMINING A SET OF SIMILAR PRE-TAGGED IMAGES AND EXTRACTING PROMINENT TAGS FROM THAT SET

(75) Inventors: Lisa Seacat Deluca, San Francisco, CA (US); Lydia M. Do, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 923 days.

(21) Appl. No.: 12/241,717

(22) Filed: Sep. 30, 2008

(65) Prior Publication Data

US 2010/0080470 A1    Apr. 1, 2010

(51) Int. Cl.
*G06K 9/00* (2006.01)
*G06K 9/46* (2006.01)
*G06K 9/66* (2006.01)
*G06F 17/00* (2006.01)

(52) U.S. Cl. ........ 382/181; 382/190; 382/192; 715/230; 715/231; 715/233

(58) Field of Classification Search ........................ None
See application file for complete search history.

(56) References Cited

U.S. PATENT DOCUMENTS

| | | | | |
|---|---|---|---|---|
| 2006/0195858 A1* | 8/2006 | Takahashi et al. | ............... | 725/19 |
| 2007/0050175 A1* | 3/2007 | Schmelzer et al. | ............ | 702/186 |
| 2007/0271226 A1* | 11/2007 | Zhang et al. | ....................... | 707/3 |
| 2008/0021928 A1* | 1/2008 | Yagnik | ......................... | 707/104.1 |
| 2008/0021981 A1* | 1/2008 | Kumar et al. | .................. | 709/219 |
| 2009/0307618 A1* | 12/2009 | Lawler et al. | ................. | 715/764 |
| 2010/0082576 A1* | 4/2010 | Walker et al. | .................. | 707/706 |

OTHER PUBLICATIONS

Markoff et al, "With a Cellphone as My Guide," New York Times, 2006. [online],[retrieved on Sep. 14, 2011]. Retrieved from the Internet <http://www.nytimes.com/2006/06/28/technology/28locate.html>.*
Snavely, et al, "Photo Tourism: Exploring Photo Collections in 3D," Journal ACM Transactions on Graphics (TOG)—Proceedings of ACM SIGGRAPH 2006, vol. 25 Issue 3, Jul. 2006.*
"Photosynth", Microsoft Live Labs, 2006.
"Software Recognizes and Describes Images in Words", CBC News, Nov. 2, 2006.

* cited by examiner

*Primary Examiner* — Andrew W Johns
*Assistant Examiner* — David F Dunphy
(74) *Attorney, Agent, or Firm* — Patents on Demand P.A.; Brian K. Buchheit; Scott M. Garrett

(57) ABSTRACT

An image can be compared with a set of images, each including pre-existing tags. A similar image set can be determined from results of the comparing. Pre-existing tags can be extracted from the similar image set. Prominent tags can be determined from the extracted pre-existing tags. At least one of the determined prominent tags can be added to a tag set associated with the image.

15 Claims, 2 Drawing Sheets

Image 310                                                  Image 315

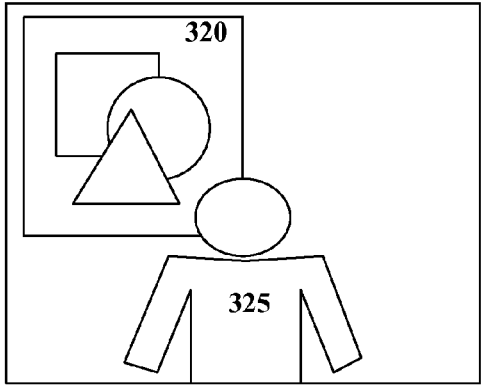 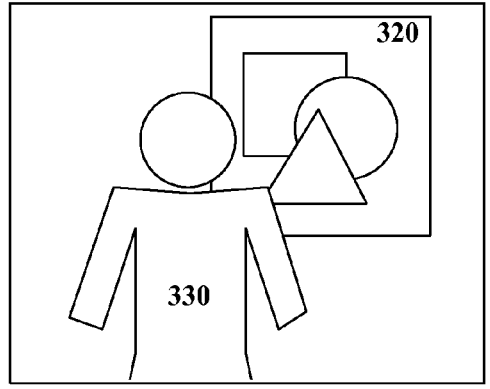

Example 340

Initial Tags: Susan, Macklebee, Tour, Mona Lisa, art, picture, museum  342

↓

Final Tags: Mona Lisa, Susan, Macklebee, Tour, art, picture, museum  344

Initial Tags: Mona Lisa, La Gioconda, Leonardo Da Vinci, 16th century  360

↓  362

Final Tags: Mona Lisa, La Gioconda, Leonardo Da Vinci, 16th century

Note: in the above example, Mona Lisa, which is a prominent tag in the initial list, is moved to a beginning of the tag list

Example 350

Initial Tags: Susan Macklebee, Tour, art, picture, museum  352

↓

Final Tags: Susan Macklebee, Tour, art, picture, museum, Mona Lisa  354

Note: in the above example, Mona Lisa, which is a prominent tag not in the initial list, is appended to the end of the tag list

FIG. 3

TAGGING IMAGES BY DETERMINING A SET OF SIMILAR PRE-TAGGED IMAGES AND EXTRACTING PROMINENT TAGS FROM THAT SET

BACKGROUND

The present invention relates to the field of content tagging and, more particularly, to tagging graphic objects by determining a set of similar pre-tagged graphic objects and extracting prominent tags from that set.

Digital content tagging is frequently implemented in software to allow for fast and efficient searching of the content. Tags are associated with digital content and they are commonly descriptors of the content's semantic content. Digital content can include images, video, and other digital content that are not easily searched. To enable searching, tags can be searched rather than the content itself. The biggest problem faced in tagging digital content is finding relevant tags for all of the content. Many systems rely on users to provide relevant semantic tags for content. This approach can be error prone and extremely time consuming.

A number of solutions exist for automatic content tagging of images or graphic objects, such as digital pictures. One technique is to perform object recognition to recognize discrete items visually rendered within an image and to then to add a tag for the recognized object to the image. Object recognition from an image can be processor and memory intensive. Additionally, many recognizable items in an image are relatively unimportant from an image tagging perspective.

BRIEF DESCRIPTION OF THE SEVERAL VIEWS OF THE DRAWINGS

FIG. 3 illustrates a scenario in which two images are compared to each other and found similar, where tags of one image are leveraged to update tags of another.

DETAILED DESCRIPTION

Figure 1:
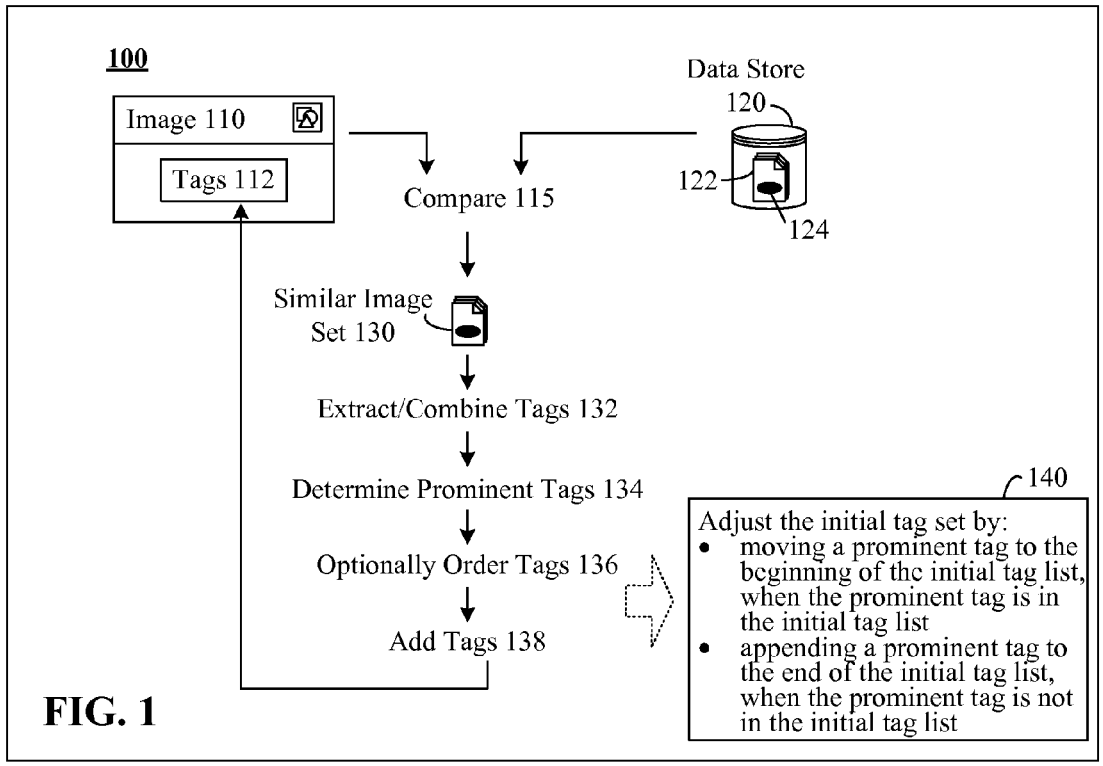
FIG. 1 is a flow diagram of a system for adding tags to an image based upon pre-existing tags present in similar images in accordance with an embodiment of the inventive arrangements disclosed herein.

One embodiment of the present invention teaches a solution to tag images by leveraging pre-existing tags of similar images. In the solution, an image can be compared with a set of other pre-tagged images. The comparison can be based upon a photogrammetric technique, such as that used for photo tourism or implemented within MS PHOTOSYNTH (or other software product able to infer 3-D structures from a set of 2-D images). Once pre-tagged images are determined to be similar to the image being analyzed, tags of the similar pre-tagged images can be combined and analyzed. The most predominant tags can then be automatically applied to the image being analyzed. The analyzed image can be a new image not having any initial tags or can be an image that includes one or more initial tags, where the persistent tags are added to the initial tags. In one embodiment, the tags added to the image can be ordered by importance level, which can be determined at least in part based upon how persistent each tag is within the set of similar image.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, for instance, via optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present invention may be written in any combination of one or more programming languages, including an object orientent programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

FIG. 1 is a flow diagram of a system 100 for adding tags to an image based upon pre-existing tags present in similar images in accordance with an embodiment of the inventive arrangements disclosed herein.

In system 100, an image 110, which may or may not have initial tags 112 can be compared 115 against a set of images 122 stored in a data store 120. Each of the images 122 can be tagged 124. A set 130 of images resulting from the comparison 115 can be generated. The tags included in this set 130 can be extracted and combined 132. A set of prominent tags can then be determined 134. That is, the extracted tags can be scored and/or filtered until only those tags deemed to be important remain. In one embodiment, tags can be associated with a prominence score that can be used to order 136 the tags by prominence. The prominent tags can be added 138 to the image 110. Thus, tags 112 are automatically updated based upon pre-existing tags 124 from similar images. In one embodiment shown by block 140, the ordering (136) and adding (138) of tags can result in a prominent tag (determined in step 134) being moved to the beginning of an initial tag list when the prominent tag is in the initial list (112) and/or can result in appending a prominent tag to the end of the initial tag list, when the prominent tag is not in the initial tag list.

Although numerous different technologies can be utilized to determine the set 130 of similar images, one of the contemplated ones involves photogrammetric techniques. Photogrammetry utilizes geometric properties about objects that are determined from photographic images. Photogrammetry can determine measurements from a set of photographs, such as measurements calculated by photomapping applications.

One applicable use of photogrammetry is to take a large set of images, to reconstruct camera viewpoints, and to automatically compute orbits, panoramas, canonical views, and optimal paths between views. Thus, the similar image set 130 can represent a set of images within a common path as image 110. In other words, image 110 can represent one of a set 130 of images that can be used to automatically generate a 3D model from a set of images, to enable a user to interactively move about a 3D space by seamlessly transitioning between a set of photographs, and the like. Photo tourism is a coined term for producing such a 3D space using a set of photographs. Modeling products, such as MS PHOTOSYNTH, exist which create an interactive 3D environment from a photograph set.

In system 100, pre-existing tags included in a set of similar or related photographs can be leveraged to update tags 112 of new images. Additionally, tags of a set of images can be re-ordered based upon prominence of tags within an image set (e.g., a set of images including set 130 and image 110), which can be helpful in tag based searching.

Automatically tagging new images 110 based upon pre-existing tags 124 can be utilized in many different situations which are demonstrated by a few use cases that follow. Situations for which the disclosure solution is applicable are not to be construed as limited to these use cases.

In a first use case, a digital picture can be taken at the Louvre of a family member standing in front of the Mona Lisa. Initially this picture can be untagged. A set of tagged pictures can be found to be similar (e.g., using a photogrammetry based technology). In one embodiment, this similarity can be determined in context of an unrelated activity, such as constructing a 3D space based upon a set of images of the Louvre, which include the new image. Regardless, prominent tags can be extracted from the similar set, which can include "Mona Lisa", "Louvre", "museum", "Paris", and the like. These tags can be automatically added to the new image.

From this use case, a few things should be emphasized. First, the greater a quantity of pictures in the set 130, and the more often tagged pictures are analyzed for relevance, the greater an accuracy of automatically added tags 112. The original tags 124 being leveraged can include manually entered tags as well as automatically established tags created using any technique. Filters and rules for assessing the prominence of tags (134) can be improved using feedback techniques and/or customized using user specific settings. Additionally, relevant tags can be added, even though an image owner can be unaware of many important characteristics specified by a tag. For example, the person taking the digital picture may be unaware that the picture that the family member was proximate to was the Mona Lisa, and may be unaware that the Mona Lisa was located in the Louvre. Nevertheless, these tags can be added, which others can utilize when searching a tagged image store.

A second use case occurs in a medical context. Assume a person has a skin rash and is unsure whether they should see a physician. Using system 100, that person can take a picture of the skin rash and compare it against a set of tagged images, which can be a generic set of images or a set specifically constructed for a medical context. A set of images similar to that of the rash can be determined and pre-existing tags can be extracted. Additionally, a prominence score associated with each tag can be shown and filters can be applied to only include tags related to medical symptoms. Thus, results can include: rug burn 88%, poison ivy 5%, Lyme disease 1%, other 6%. Thus, a person receiving these results can feel somewhat confident that the skin rash that they have taken a picture of is most likely a rug burn and that a trip to see a physician may be unnecessary.

In another contemplated use case, pictures of medicines and drugs can be taken and compared against a verified and previously tagged set of images. Thus, a similar set 130 of images can be determined of pills having a unique color, shape, and markings similar to an unknown pill, which may be identified based upon the tags 122 extracted from the set 130.

In still another use case, automatic tagging can be applied in an inventory context. For example, different types of automobiles and their parts (e.g., from a junkyard of parts warehouse) can be captured in digital images. These images can be compared against tagged images 122 to ultimately create tags 112 for the new images. These tags 112 can be searched to respond to specific inquiries concerning available parts.

In yet another contemplated use case, condition tracking can be performed. For example, patient pictures can be taken during treatment and tagged with a particular prognosis. Any untagged picture of the patient (even if the patient identity is initially unknown) can be compared against a set of tagged pictures, and past treatments, treatment dates, and the like can be extracted from tags associated with the treatment pictures.

Figure 2:
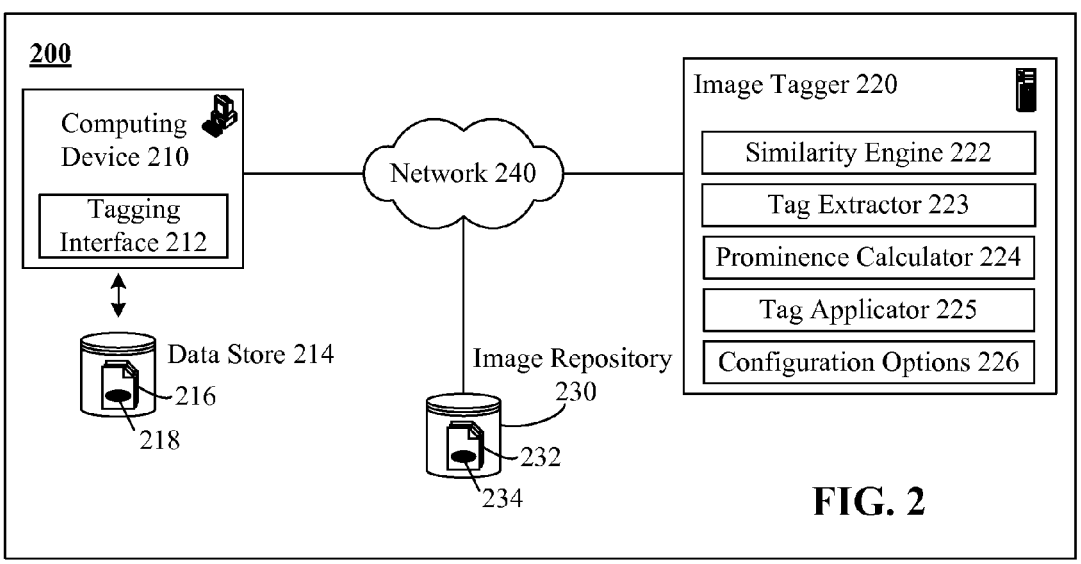
FIG. 2 is a schematic diagram of a system for adding tags to an image based upon pre-existing tags present in similar images in accordance with an embodiment of the inventive arrangements disclosed herein.

FIG. 2 is a schematic diagram of a system 200 for automatically adding tags to an image based upon pre-existing tags present in similar images in accordance with an embodiment of the inventive arrangements disclosed herein.

In system 200, a computing device 210 can be communicatively linked to an image tagger 220 and an image repository 230 via a network 240. The image repository 230 can include a set of images 232, each having a set of associated tags 234. The computing device 210 can include a tagging interface 212 that permits a user to interact with image tagger 220.

The image tagger 220 can include a similarity engine 222, a tag extractor 223, a prominence calculator 234, a tag applicator 225, configuration options 226, and other such components. The similarity engine 222 can compare one or more images 216 against a set of images 232 and determine which images of the set stored in repository 230 are similar. In one embodiment, similarity engine 222 can utilize a photogrammetry based technology (e.g., MS PHOTOSYNTH technology, photo tourism technology, etc) to determine the tagged images considered similar to an input image, to which tags are to be automatically added. In another embodiment, an object recognition technology can be used to recognize similar objects within a set of images, to determine when images are to be considered similar. In still embodiment, pre-existing tags 218, 234 associated with images can be used by similarity engine 222 to determine a set of images similar to a reference image. Any pattern matching technique can be utilized by similarity engine 222 to determine which images 232 are believed to be similar to an analyzed image.

The tag extractor 223 can extract tags 234 from similar images to form a set of combined tags applicable to the image 216 being analyzed. In one embodiment, configuration options 226 can establish criteria for extracting tags. For example, a tag can only be extracted when a previously defined threshold (established by a user configured setting) is satisfied, such as only adding a tag to a combined set of tags when that tag is present in at least fifty percent of the images determined to be similar to an analyzed image.

The prominence calculator 224 can be an optional component that calculates which tags extracted 234 from the images 232 are most prominent. Prominence can refer to persistence, meaning a number of times a term appears within different images of the set of similar images. When calculating a prominence score, synonyms can be considered. Additional weights can be applied, such as weighing tags referring to a geographically location or specific proper nouns greater than generic terms. Configuration options 226 can permit prominence score weights to be adjusted in accordance with user specified criteria.

In one embodiment, the prominence calculator 224 can be associated with and/or replaced by a filtering engine (not shown). The filtering engine can permit tags to be filtered by semantic topic area. For example, tags to be added to a previously untagged image can be restricted to "medical conditions", "art", "proper names", and any other definable category or filter.

The tag applicator 225 can apply a set of prominent tags to an analyzed image 216. In one embodiment, all tags of an image 216 (including pre-existing ones) can be assigned a prominence score (by engine 224) and ordered accordingly.

As used herein, an image can refer to any graphical object, such as a digital photograph, an X-Ray, a scanned painting, a digital drawing, and the like. Common formats for images include JPEG, BMP, TIFF, PNG, PDF, and the like.

Computing device 210 can be any device able to present a tagging interface 212. For example, device 210 can include a personal computer, a smart phone, a network enabled digital camera, and the like. The tagging interface 212 can be an interface rendered within a browser or can be a user interface of a stand-alone application executing upon 210.

Image tagger 220 can be a set of one or more devices. In various implementations, tagger 220 can be a physical or virtual server, can be a cluster of servers, and the like. The components 222-226 of tagger 220 can be implemented in software or firmware.

Network 240 can include any hardware/software/and firmware necessary to convey digital content encoded within carrier waves. Content can be contained within analog or digital signals and conveyed through data or voice channels and can be conveyed over a personal area network (PAN) or a wide area network (WAN). The network 240 can include local components and data pathways necessary for communications to be exchanged among computing device components and between integrated device components and peripheral devices. The network 240 can also include network equipment, such as routers, data lines, hubs, and intermediary servers which together form a packet-based network, such as the Internet or an intranet. The network 240 can further include circuit-based communication components and mobile communication components, such as telephony switches, modems, cellular communication towers, and the like. The network 240 can include line based and/or wireless communication pathways.

Data stores 214 and 230 can be physically implemented within any type of hardware including, but not limited to, a magnetic disk, an optical disk, a semiconductor memory, a digitally encoded plastic memory, a holographic memory, or any other recording medium. Each data store 214 and 230 can be a stand-alone storage unit as well as a storage unit formed from a plurality of physical devices, which may be remotely located from one another. Additionally, information can be stored within each data store 214 and 230 in a variety of manners. For example, information can be stored within a database structure or can be stored within one or more files of a file storage system, where each file may or may not be indexed for information searching purposes.

The arrangement of components shown in system 200 is for illustrative purposes only and is not to be construed as a limitation of the scope of the disclosure. For example, in one contemplated arrangement, functionality of components 222-226 can be implemented within computing device 210. The image repository 230 can be associated with tagger 220 and/or can be any accessible storage space for images 232. In one embodiment, the functionality of tagger 220 can be provided as a service, such as a Web service.

FIG. 3 illustrates a scenario 300 in which two images 310 and 315 are compared to each other and found similar, where tags 345 of one image 315 are leveraged to update tags 335 of another. In scenario 300 image 310 can be an analyzed image and image 315 can be an image found to be similar to image 310 (e.g., by a similarity engine 222).

Although only two images 310, 315 are shown, any number of images can be found to be similar to an analyzed one.

Further, although image 310 has an initial set of tags 335, implementations exist where an initial tag set of image 310 is null. Although, the tags 345, 350 of image 315 are shown as remaining unchanged, this is not necessarily a restriction of the disclosure. In one embodiment, final tags 344/354, 362 associated with multiple images 310, 315 can be adjusted concurrently.

Images 310, 315 can include at least one common object 320 and at least one differing object 325, 330. The differing object 325, 330 (a person) can be analyzed (e.g., by engine 222) and determined to be a transient object of an otherwise fixed scene. Thus, a lack of similarly of object 325, 330 between the images 310, 315 can be given relatively little weight. In contrast a fixed object 320 appearing in both images 310, 315 can be a relative unique and stationary object (e.g., the Mona Lisa), which causes the images to be evaluated as similar.

Regardless of why the images 310, 315 are analyzed as similar, the initial tags 342/352, 360 of the images 310, 315 can differ. "Mona Lisa" can be evaluated as being a most persistent or prominent term between the two images 310, 315.

In example 340, the initial tags 342 can be transformed into tags 344 so that the tag "Mona Lisa" is advanced to the beginning as the most persistent or prominent tag. No other change necessarily occurs between tags 342, 344. When searches are based upon prominent tags like "Mona Lisa" the term may be lost among thousands of other images, each having user tags. By adjusting a prominent tag to a beginning of a tag list (344), searches can be expedited and/or the image 310 can have a greater chance of being viewed than otherwise.

In example 350, the initial tags 352 can be transformed into tags 354 based upon a determination that "Mona Lisa" is a prominent tag (extracted from tags 360). The tag "Mona Lisa" can be appended to the end of the tags for image 310, as it did not previously exist (not included in tags 352, but is included in tags 354). Example 350 emphasizes that new prominent tags can be automatically added, even if a user is unaware that object 320 is a picture of the "Mona Lisa."

The diagrams in the FIGS. 1-3 illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A method for adding tags to images comprising:
   identifying an image-to-be-tagged;
   determining an initial tag list comprising initial tags associated with the image-to-be-tagged;
   determining a similar image set of images comprising tags
       extracting pre-existing tags from the similar image set to form a set of combined tags;
   determining a set of prominent tags, wherein the set of prominent tags comprises tags of the set of combined tags having a prominence score greater than a threshold score; and
   adjusting the initial tag list by,
       moving a prominent tag to the beginning of the initial tag list when the prominent tag is in the initial tag list, and
       appending a prominent tag to the end of the initial tag list, when the prominent tag is not in the initial tag list.

2. The method of claim 1, further comprising:
   using photogrammetry, determining the similar set of images from a larger set of images stored in an image repository;
   extracting pre-existing tags from the similar image set to form a set of combined tags;
   computing prominence scores for each tag of the combined set of tags, wherein the prominence score is based at least in part on persistence, meaning a number of times a term or tag appears within different images of the set of similar images;
   ordering the tags of the combined set of tags by prominence score;
   determining a threshold score for adding tags to the image-to-be tagged; and
   adding each of the combined tags having a prominence score greater than the threshold score, which together are the determined set of tags, to a tag set of the image-to-be-tagged.

3. The method of claim 1, further comprising:
   mapping a plurality of images, each of which is a two dimensional image, into a three dimensional space, wherein the mapping considers camera viewpoints of the images; and
   determining the similar image set, which is a subset of the plurality of images based upon which of the images share a geographic mapping in the three dimensional space with the image-to-be-tagged.

4. The method of claim 1, wherein the set of prominent tags is added to the initial tag list when the initial tag list is empty.

5. The method of claim 4, further comprising:
   before the adding the tags to a previously untagged image, restricting the tags to be added to a semantic topic area.

6. The method of claim 1, further comprising:
   performing the determining of the set of tags, and the adding of the determined prominent set of tags as a software service.

7. The method of claim 1, wherein synonyms between tags extracted from different ones of the images of the similar image set is considered when computing the prominence scores for each tag.

8. The method of claim 1, further comprising:
   applying additional weights to the prominence scores of the combined tags for tags referring to geographical locations or specific proper nouns.

9. The method of claim 1, wherein as a quantity of images increases in the similar image set, and as a quantity of tags of the set of combined tags increases, a corresponding increase occurs in an accuracy of automatically added tags to the image-to-be-tagged.

10. A computer program product for adding tags to images comprising:
    a non-transitory computer usable storage medium having computer usable program code embodied therewith, the computer usable program code comprising:

computer usable program code configured to identify an image-to-be-tagged;

computer usable program code configured to determine an initial tag list comprising initial tags associated with the image-to-be-tagged;

computer usable program code configured to, using photogrammetry, determine a similar image set of images from a larger set of images stored in an image repository, wherein each of the images in the similar image set are tagged with one or more textual tags;

computer usable program code configured to extract pre-existing tags from the similar image set to form a set of combined tags;

computer usable program code configured to compute prominence scores for each tag of the combined set of tags, wherein the prominence score is based at least in part on persistence, meaning a number of times a term or tag appears within different images of the set of similar images;

computer usable program code configured to determine a set of prominent tags, wherein the set of prominent tags comprises tags of the set of combined tags having a prominence score greater than a threshold score; and computer usable program code configured to adjust the initial tag list by,
moving a prominent tag to the beginning of the initial tag list when the prominent tag is in the initial tag list, and
appending a prominent tag to the end of the initial tag list, when the prominent tag is not in the initial tag list.

11. The computer program product of claim 10, wherein the photogrammetry technique is a photo tourism technique, wherein each of the images in the similar image set comprise multiple different objects within their images.

12. The computer program product of claim 10, further comprising:
computer usable program code configured to map the images being compared, each of which is a two dimensional image, into a three dimensional space, wherein the mapping considers camera viewpoints of the images; and
computer usable program code configured to determine a set of similar images based upon which of the images share a geographic mapping in the three dimensional space with the image to which the prominent tags are added.

13. The computer program product of claim 10, wherein the set of prominent tags is added to the initial tag list when the initial tag list is empty.

14. The computer program product of claim 10, further comprising:
computer usable program code configured to perform the comparing of the images, the determining of the similar image set, the extracting of pre-existing tags, the determining of prominent tags, and the adding of the determined prominent tags as a software service.

15. A method comprising:
identifying an image-to-be-tagged;
accessing an image repository, wherein the image repository includes a set of images each having a set of associated tags;
comparing the image-to-be-tagged with the set of images in the image repository;
identifying one or more images from the set of images as being similar to the image-to-be-tagged based on the comparison;
determining a set of tags associated with the set of images identified as being similar to the image-to-be-tagged;
assigning prominence scores to the set of tags to determine a set of prominent tags; and
updating a list of tags associated with the image-to-be-tagged with the set of prominent tags, wherein the updating comprises adjusting the list of tags by,
moving a prominent tag of the set of prominent tags to the beginning of the list of tags when the prominent tag is in the list of tags, and
appending a prominent tag of the set of prominent tags to the end of the list of tags when the prominent tag is not in the list of tags.

* * * * *